United States Patent
Boda et al.

(10) Patent No.: US 7,168,324 B2
(45) Date of Patent: Jan. 30, 2007

(54) VIBRATION INFORMATION TRANSMISSION APPARATUS AND VIBRATION MONITORING/ANALYZING SYSTEM

(75) Inventors: Shingo Boda, Tokyo (JP); Hiroyuki Maeda, Tokyo (JP)

(73) Assignee: Shinkawa Sensor Technology, Inc., Tokyo (JP)

( * ) Notice: Subject to any disclaimer, the term of this patent is extended or adjusted under 35 U.S.C. 154(b) by 52 days.

(21) Appl. No.: 10/524,105

(22) PCT Filed: Aug. 12, 2002

(86) PCT No.: PCT/JP02/08230

§ 371 (c)(1),
(2), (4) Date: Feb. 10, 2005

(87) PCT Pub. No.: WO2004/017033

PCT Pub. Date: Feb. 26, 2004

(65) Prior Publication Data

US 2005/0284226 A1 Dec. 29, 2005

(51) Int. Cl.
*G01N 29/00* (2006.01)
*G05B 23/02* (2006.01)

(52) U.S. Cl. .......................... 73/660; 73/593; 73/664; 702/56

(58) Field of Classification Search ................ 73/660, 73/664, 493, 593; 702/56, 59; 340/870.11
See application file for complete search history.

(56) References Cited

U.S. PATENT DOCUMENTS

| | | | | |
|---|---|---|---|---|
| 5,433,111 A | * | 7/1995 | Hershey et al. | ................ 73/593 |
| 5,579,013 A | * | 11/1996 | Hershey et al. | ........ 342/357.06 |
| 5,854,994 A | * | 12/1998 | Canada et al. | ................ 702/56 |
| 6,044,698 A | * | 4/2000 | Bryan | ........................ 73/146 |
| 6,292,108 B1 | * | 9/2001 | Straser et al. | .......... 340/870.11 |
| 6,456,945 B1 | * | 9/2002 | Sonnichsen et al. | .......... 702/56 |
| 6,807,862 B2 | * | 10/2004 | Duron et al. | ................. 73/649 |
| 2003/0014199 A1 | * | 1/2003 | Toomey | ....................... 702/56 |
| 2003/0088346 A1 | * | 5/2003 | Calkins et al. | ................ 701/29 |
| 2004/0243351 A1 | * | 12/2004 | Calkins et al. | .............. 702/185 |

FOREIGN PATENT DOCUMENTS

| JP | 2002-529756 A | 9/2002 |
|---|---|---|
| WO | WO-00/29270 A | 5/2000 |

\* cited by examiner

*Primary Examiner*—Hezron Williams
*Assistant Examiner*—Jacques Saint-Surin
(74) *Attorney, Agent, or Firm*—Birch, Stewart, Kolasch & Birch, LLP

(57) ABSTRACT

A vibration information transmission apparatus for improving efficiency of field wiring of a vibration monitoring/analyzing system includes transmitters (11-1 to n) for converting vibration information from vibration sensors (2-1 to n) for detecting vibration of an object to be measured, into an electric signal and outputting the electric signal to a digital network (DN). The transmitters (11-1 to n) includes in the same casing, a transducer circuit (18) for converting the vibration information from the vibration sensors (2-1 to n) into an analog electric signal, an A/D conversion circuit (19) for converting the analog electric signal from the transducer circuit (18) into a digital signal, and a network interface (20) for outputting the digital signal from the A/D conversion circuit (19) to the digital network (DN).

3 Claims, 6 Drawing Sheets

VIBRATION INFORMATION TRANSMISSION APPARATUS AND VIBRATION MONITORING/ANALYZING SYSTEM

TECHNICAL FIELD

The present invention relates to a vibration information transmission apparatus and a vibration monitoring/analyzing system. More particularly the present invention is intended to reduce the amount of a wiring work which is made in a field (site) for a system for analyzing vibrations of rotating machines such as a generator, a turbine, a fan, and a pump.

BACKGROUND ART

As shown in FIG. 6, a vibration monitoring/analyzing system 1 of a rotating machine conventionally provided has a plurality of vibration sensors 2-1 to n installed on a bearing portion of the rotating machine, transducer circuits 3-1 to n for converting sensor output signals which are vibration information transmitted thereto from the vibration sensors 2-1 to n into analog electric signals proportional to vibration values, a vibration monitor 4 for displaying the analog electric signals transmitted thereto from the transducer circuits 3-1 to n and monitoring abnormal vibrations and giving a warning, an analysis/diagnosis apparatus 5 for analyzing and diagnosing vibrations upon receipt of the analog electric signals transmitted thereto from the vibration monitor 4 and having an A/D conversion circuit, and a personal computer 6 for displaying results of analysis and diagnosis made by the analysis/diagnosis apparatus 5.

The method of wiring apparatuses is as follows: The vibration sensors 2-1 to n are individually connected with the transducer circuits 3-1 to n by using a plurality of analog electric wires AW1. The transducer circuits 3-1 to n are individually connected with the vibration monitor 4 by using a plurality of analog electric wires AW2. The vibration monitor 4 is connected with the analysis/diagnosis apparatus 5 by using a plurality of analog electric wires AW3. The analysis/diagnosis apparatus 5 is connected with the personal computer 6 by using a digital network DN.

When the vibration monitoring/analyzing system 1 analyzes and diagnoses vibrations, the analysis/diagnosis apparatus 5 analyzes and diagnoses the cause of the generation of the vibration by performing transient analysis and FFT analysis of vibration information obtained by the vibration sensors 2-1 to n during one rotation of a rotor of the rotating machine.

However, in the vibration monitoring/analyzing system 1, analog signals are transmitted between the vibration sensors 2-1 and the transducer circuits 3-1 to n, between the transducer circuits 3-1 to n and the vibration monitor 4, and between the vibration monitor 4 and the analysis/diagnosis apparatus 5. Therefore it is necessary to connect them by using the individual analog electric wires AW1, AW2, and AW3. Thus when there are many points at which vibrations are to be measured, it is necessary to use the same number of the electric wires AW1, AW2, and AW3 as that of the points at which vibrations are to be measured. Thus there is an increase in the number of the electric wires and in the amount of the wiring work.

Further owing to the increase in the number of the electric wires, the wiring work is complicated in the field (site) and the maintenance cost increases.

The present invention has been made in view of the above-described problem. Thus it is an object of the present invention to perform an efficient field wiring work for a system for monitoring/analyzing vibrations of a rotating machine.

DISCLOSURE OF THE INVENTION

The present invention provides a vibration information transmission apparatus including a transmitter provided as an apparatus for outputting vibration information transmitted thereto from a vibration sensor for detecting vibration of an object to be measured to a digital network.

The transmitter has in the same casing a transducer circuit for converting the vibration information transmitted thereto from the vibration sensor into an analog electric signal; an A/D conversion circuit for converting the analog electric signal transmitted thereto from the transducer circuit into a digital signal, and a network interface for outputting the digital signal transmitted thereto from the A/D conversion circuit to the digital network.

In the above-described construction, there are provided the transmitters each integrally accommodating the transducer function, the A/D conversion circuit, and the network interface in the same casing, it is possible to reduce the amount of the wiring work, reduce the wiring cost, and improve the wiring workability.

Because the transducer circuit, the A/D conversion circuit, and the network interface are integrated inside the transmitter, it is possible to make the system small and save the space in the field (site).

The transmitter has an overall vibration detection circuit, provided in parallel with the A/D conversion circuit, for detecting an abnormal vibration by reading an amplitude value of the analog electric signal transmitted thereto from the transducer circuit and outputting signals to the network interface.

In the above-described construction, the transmitters are capable of performing the function of detecting the abnormal vibration by reading the amplitude value, although conventionally, the vibration monitor performs this function. Thus the construction of the system can be simplified.

The present invention provides a vibration monitoring/analyzing system for transmitting vibration data transmitted thereto from the above-described vibration information transmission apparatus to an analysis/diagnosis means or/and a vibration monitoring means for monitoring an abnormal vibration through the digital network and giving a warning.

The analysis/diagnosis means is connected with the digital network. Thus it is possible to use one wire for the analysis/diagnosis means and enhance the degree of freedom in disposing the analysis/diagnosis means. The cause of the generation of the vibration is analyzed and diagnosed by analyzing the frequency of time-series sampling data, transmitted from the transmitters, by FFT analysis.

The vibration monitoring means is connected with the digital network. Thus it is possible to use one wire for the vibration monitoring means and enhance the degree of freedom in disposing the vibration monitoring means.

A plurality of the transmitters is connected to a plurality of the vibration sensors individually at 1:1, and a plurality of the circuits of the vibration sensor 2-1 to n→the transducer circuit 18→the A/D conversion circuit 19→the network interface 20 are independent of one another. Thus it is possible to accomplish synchronous measurement (sampling) for all the vibration sensors.

That is, when the system is so constructed that signals transmitted from a plurality of the vibration sensors are not processed by independent circuits but multiplexed by using a multiplexer and transmitted to the A/D converter and the network interface, the signals transmitted thereto from the vibration sensors are switched and multiplexed by the multiplexer. Thus it is impossible to synchronize starts in measurement of the signals transmitted from the vibration sensors. But in the present invention, since the transmitters are connected with the vibration sensors individually at 1:1, it is possible to accomplish synchronous measurement among the transmitters.

The trigger signal for use in the synchronous measurement may be transmitted through the digital network connected with the transmitters.

The above-described vibration monitoring/analyzing system further includes a means for generating a synchronizing trigger signal at a reference position in a rotation phase of a rotating machine to be measured, wherein each of transmitters has an input portion of the synchronizing trigger signal transmitted from the means for generating the synchronizing trigger signal.

By transmitting the trigger signal for use in the synchronous measurement in correspondence with the reference position in the rotation phase of the rotating machine, it is possible to accomplish the synchronous measurement of the rotation of the rotating machine and measure the vibration phase of the rotating machine.

BEST MODE FOR CARRYING OUT THE INVENTION

The embodiments of the present invention will be described below with reference to the drawings.

Figure 1:
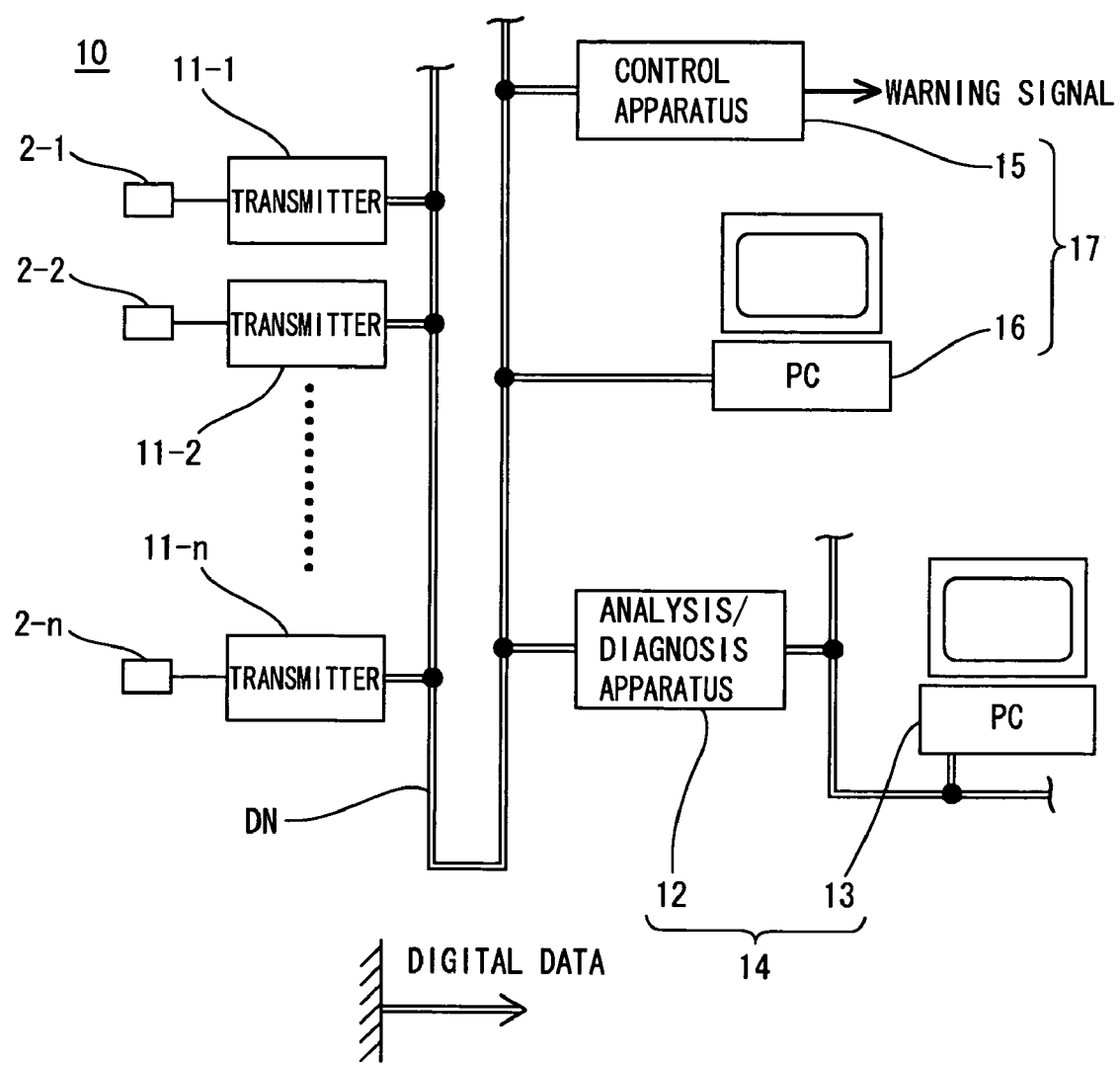
FIG. 1 shows the entire construction of a vibration monitoring/analyzing system according to an embodiment of the present invention.

As shown in FIG. 1, a vibration monitoring/analyzing system 10 of an embodiment has vibration sensors 2-1 to n installed on a rotating machine to be diagnosed, transmitters 11-1 to n connected individually at 1:1 with the vibration sensors 2-1 to n, a digital network (filed bus) DN connected with each of the transmitters 11-1 to n, an analysis/diagnosis means 14 connected with the digital network DN, and a vibration monitoring means 17 connected with the digital network DN.

Figure 3:
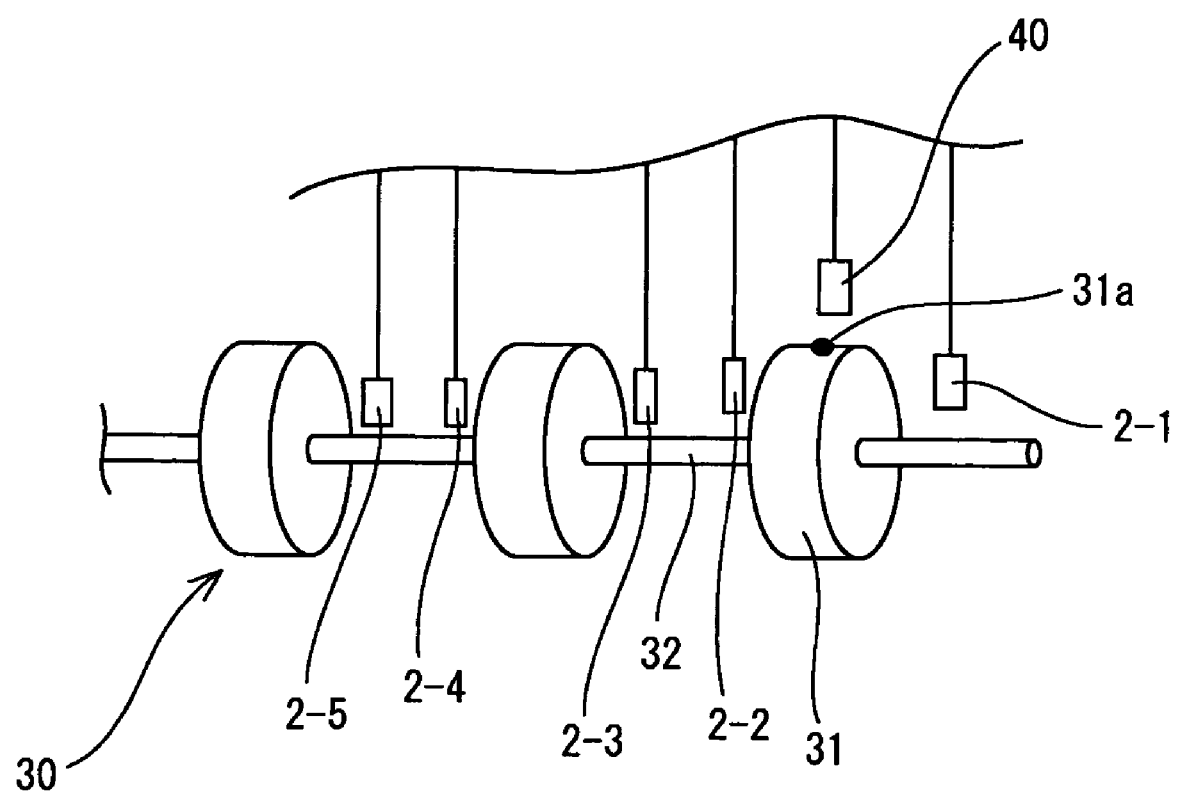
FIG. 3 is a schematic view showing a state in which a sensor is mounted on a rotating machine.

As shown in FIG. 3, a rotating machine 30 has rotors 31 mounted on a rotary shaft 32 by spacing them at certain intervals. The vibration sensors 2-1 to n are installed on a bearing portion of each of the rotors 31. A sensor 40 serving as a means for generating a synchronizing trigger signal is installed on the surface of one rotor 31.

As the vibration sensors 2-1 to n and the sensor 40, a non-contact displacement sensor of an eddy current type is used. A speed sensor and an acceleration sensor can be also used as the vibration sensors 2-1 to n and the sensor 40. A marker 31a is provided on the peripheral surface of the rotor 31 at a position of 0° in the rotation phase of the rotor 31. Each time the marker 31a passes directly under the sensor 40 owing to the rotation of the rotor 31, the synchronizing trigger signal is generated.

Figure 2:
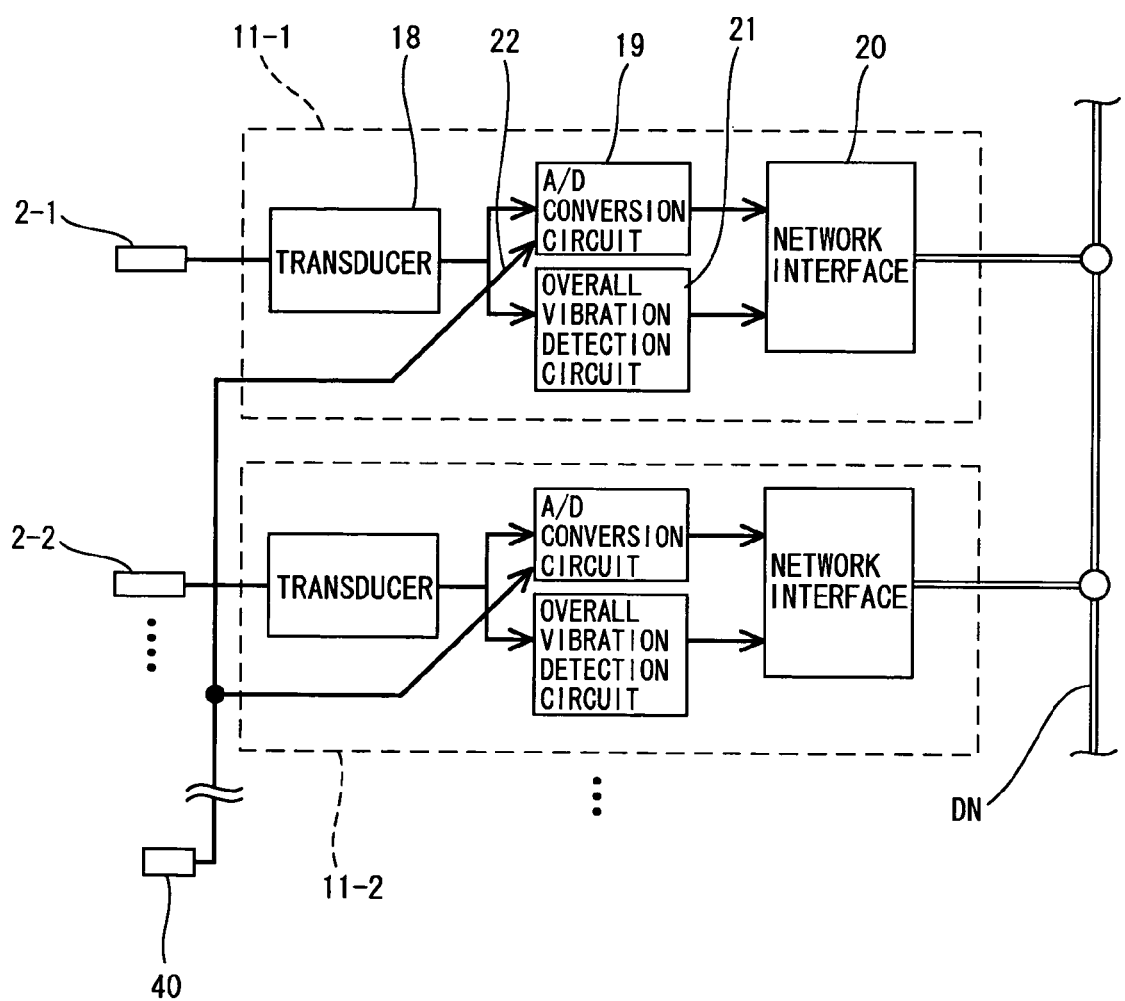
FIG. 2 shows the construction of a transmitter.

As shown in FIG. 2, each of the transmitters 11-1 to n includes in the same casing a transducer circuit 18 for converting a sensor output signal which is vibration information transmitted thereto from one of the vibration sensors 2-1 to n into an analog electric signal proportional to a vibration value, an A/D conversion circuit 19 for converting the analog electric signal transmitted thereto from the transducer circuit 18 into a digital signal, a network interface 20 for outputting the digital signal transmitted thereto from the A/D conversion circuit 19 to the digital network DN, and an overall vibration detection circuit 21, provided in parallel with the A/D conversion circuit 19, for detecting an abnormal vibration. The A/D conversion circuit 19 is provided with an input portion 22 of the synchronizing trigger signal transmitted thereto from the sensor 40.

The analysis/diagnosis means 14 is disposed in a central control room or the like and is constructed of an analysis/diagnosis apparatus 12 connected with the digital network DN and a personal computer 13 connected with an output side of the analysis/diagnosis apparatus 12.

The analysis/diagnosis apparatus 12 requests the transmitters 11-1 to n as necessary to transmit time series sampling data thereto and analyses frequency by an FFT analysis. The analysis/diagnosis apparatus 12 outputs the result of the analysis of the frequency to the personal computer 13 and by using a view software installed on the personal computer 13, analyses and diagnoses the cause of abnormality from the component (fn) of the number of rotations of the rotating machine extracted from the result of the analysis of the frequency and characteristic frequency components (high frequency, low frequency, 2fn, fn/2, and danger speed fc).

The vibration monitoring means 17 is disposed in a filed (site) and constructed of a control apparatus 15 and a personal computer 16 connected individually with the digital network DN.

The control apparatus 15 receives real-time data of a vibration value (overall amplitude value) detected by the overall vibration detection circuit 21 which reads a P-P value (peak-to-peak value) and outputs a warning for an abnormal vibration and a warning signal for stopping the rotating machine urgently.

The personal computer 16 receives the vibration data from the transmitters 11-1 to n and by using a monitoring software installed therein, performs an indication and a display like the conventional vibration monitor.

In the above-described construction, because each of the transmitters 11-1 to n integrally accommodates the transducer circuit 18, the A/D conversion circuit 19, and the network interface 20 in the same casing, it is possible to reduce the wiring cost, improve the wiring workability, accomplish miniaturization, and save the space in the field (site).

Because the analysis/diagnosis apparatus 12, the control apparatus 15, and the personal computer 16 are individually connected with the digital network DN, the apparatuses 12, 15, and 16 can be individually connected to an arbitrary position of the digital network DN. Thus it is possible to enhance the degree of freedom in disposing these apparatuses and use one wire for each of the apparatuses 12, 15, and 16.

Figure 4:
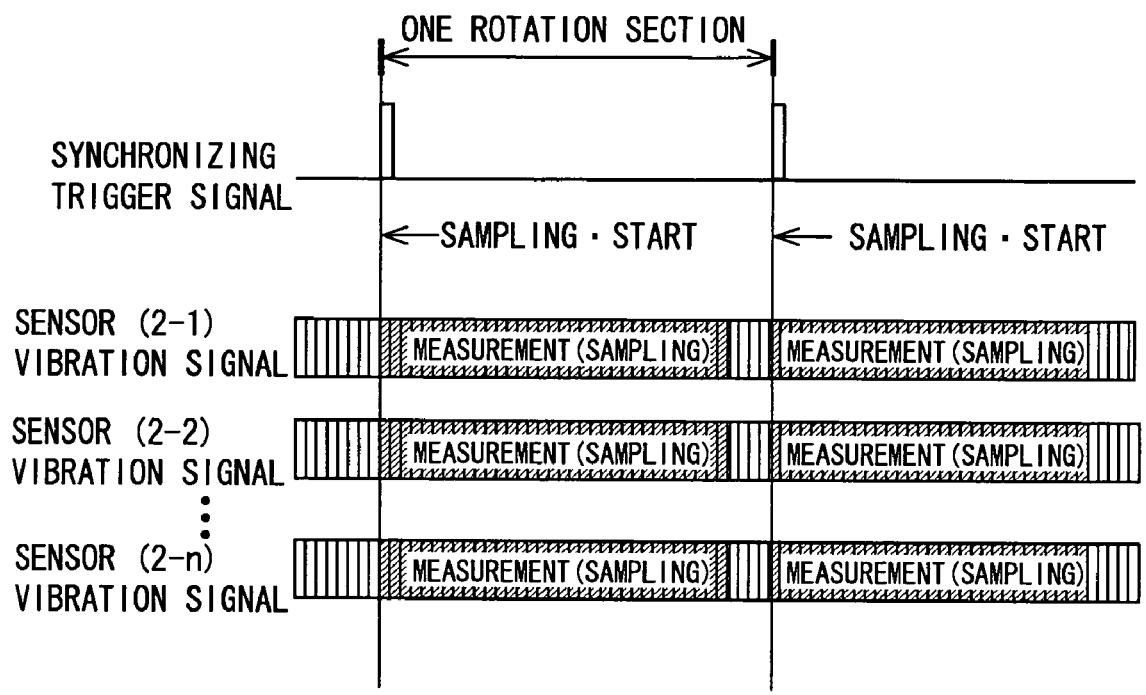
FIG. 4 is a concept view of a synchronous measurement.

As shown in FIG. 2, the transmitters 11-1 to n are connected to the vibration sensors 2-1 to n individually at 1:1, and a plurality of the circuits of the vibration sensor 2-1 to n→the transducer circuit 18→the A/D conversion circuit 19→the network interface 20 are independent of one another. Thus as shown in FIG. 4, it is possible to independently perform successive signal processing for each of the vibration sensors 2-1 to n and accomplish synchronous measurement (sampling) by using the synchronizing trigger signal transmitted from the sensor 40 as a sampling start.

Figure 5A:
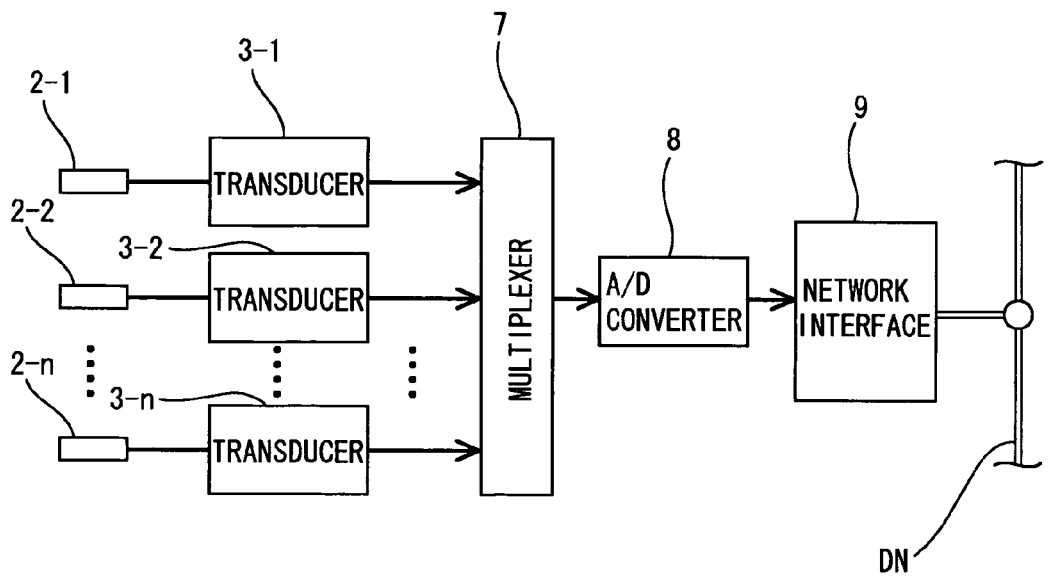
FIG. 5 shows a comparison example, in which 5(A) is a construction view and 5(B) is a concept view of a measuring timing.
Figure 5B:
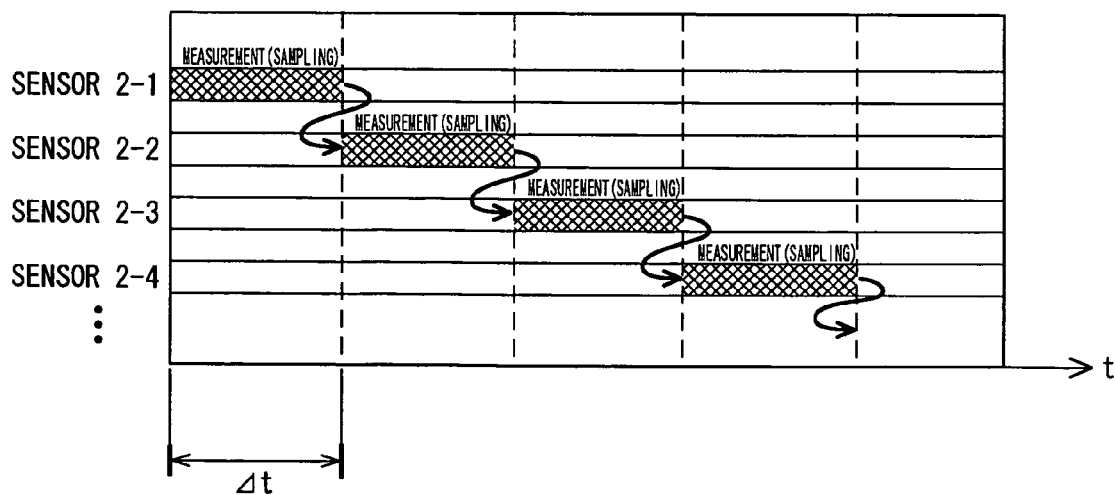
Figure 6:
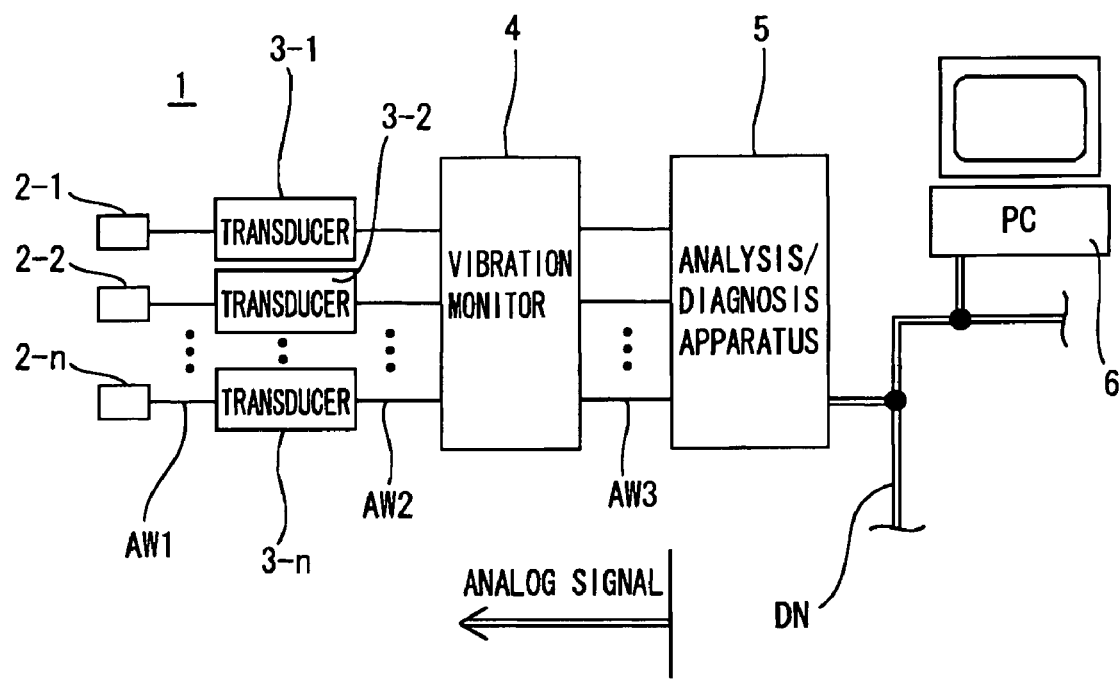
FIG. 6 is a construction view of a conventional vibration monitoring/analyzing system.

More specifically, in digitizing a system, as shown in FIG. 5(A) showing a comparison example, when the system is so constructed that a multiplexer 7 multiplexes analog signals transmitted thereto from a plurality of vibration sensors 2-1 to n and from transducers 3-1 to n and outputs the multiplexed analog signals to one A/D converter 8 and a network interface 9, as shown in FIG. 5(B), there occurs a deviation of a time Δt in timings of measurement (sampling) of the signals transmitted to multiplexer 7 from the vibration sensors 2-1 to n because the signals transmitted to the multiplexer 7 from the vibration sensors 2-1 to n are switched and multiplexed by the multiplexer 7. Therefore it is impossible to synchronize starts of measurement of the vibration sensors 2-1 to n.

On the other hand, in the present invention, as described above, since the transmitters 11-1 to n are connected with the vibration sensors 2-1 to n individually at 1:1, it is possible to accomplish synchronous measurement among the transmitters 11-1 to n.

The synchronizing trigger signal outputted when the sensor 40 is coincident with the marker 31a provided on the rotor 31 of the rotating machine 30 corresponds to the position of 0° in the rotation phase of the rotor 31. Therefore it is possible to accomplish the synchronous measurement by setting the position of 0° in the rotation phase of the rotor 31 as the sampling start. Thereby it is possible to measure the vibration phase of the rotating machine 30.

The trigger signal for use in the synchronous measurement may be transmitted through the digital network DN connected with the transmitters 11-1 to n. In this case, a signal conductor for the synchronous measurement can be eliminated.

By providing the overall vibration detection circuit 21 for reading the peak value of the analog electric signal transmitted thereto from the transducer circuit 18 and detecting an abnormal vibration inside each of the transmitters 11-1 to n, the transmitters 11-1 to n are capable of performing the function of detecting the abnormal vibration by reading the amplitude value, although this function is conventionally performed by the vibration monitor. Thus the construction of the system can be simplified.

INDUSTRIAL APPLICABLITY

As apparent from the foregoing description, according to the present invention, because each of the transmitters 11-1 to n accommodates the transducer circuit 18, the A/D conversion circuit 19, and the network interface 20 in the same casing, it is possible to reduce the wiring cost, improve the wiring workability, accomplish miniaturization, and save the space in the field (site).

The analysis/diagnosis means and the vibration monitoring means are connected with the digital network. Thus it is possible to use one wire for each of the analysis/diagnosis means and the vibration monitoring means and enhance the degree of freedom in disposing the analysis/diagnosis means and the vibration monitoring means.

A plurality of the transmitters is connected to a plurality of the vibration sensors individually at 1:1, and a plurality of the circuits of the vibration sensor 2-1 to n→the transducer circuit 18→the A/D conversion circuit 19→the network interface 20 are independent of one another. Thus it is possible to accomplish synchronous measurement (sampling) for all the vibration sensors.

By providing the overall vibration detection circuit for reading the amplitude value of the analog electric signal transmitted thereto from the transducer circuit and detecting the abnormal vibration inside the transmitters, the transmitters are capable of performing the function of detecting the abnormal vibration by reading the amplitude value, although conventionally, the vibration monitor performs this function. Thus the construction of the system can be simplified.

What is claimed is:

1. A vibration monitoring/analyzing system for transmitting vibration data transmitted thereto from a vibration information transmission apparatus to an analysis/diagnosis means or/and a vibration monitoring means for monitoring an abnormal vibration through said digital network and giving a warning, wherein:

the vibration information transmission apparatus comprises at least one transmitter provided as an apparatus for outputting vibration information transmitted thereto from a vibration sensor for detecting vibration of an object to be measured to a digital network, said transmitter having in the same casing:

a transducer circuit for converting said vibration information transmitted thereto from said vibration sensor into an analog electric signal;

an A/D conversion circuit for converting said analog electric signal transmitted thereto from said transducer circuit into a digital signal; and a network interface for outputting said digital signal transmitted thereto from said A/D conversion circuit to said digital network;

the vibration monitoring/analyzing system further comprising:

a means for generating a synchronizing trigger signal at a reference position in a rotation phase of a rotating machine to be measured, wherein each transmitter has an input portion of said synchronizing trigger signal transmitted from said means for generating said synchronizing trigger signal.

2. The vibration information transmission apparatus according to claim 1, wherein said transmitter has an overall vibration detection circuit, provided in parallel with said A/D conversion circuit, for detecting an abnormal vibration by reading an amplitude value of said analog electric signal transmitted thereto from said transducer circuit and outputting signals to said network interface.

3. The vibration monitoring/analyzing system according to claim 1, wherein a plurality of transmitters is connected to a plurality vibration sensors individually at 1:1.

* * * * *